United States Patent [19]

Haramoto

[11] Patent Number: 4,569,510
[45] Date of Patent: Feb. 11, 1986

[54] QUICK SETTING VISE

[75] Inventor: Kunihiko Haramoto, Hiroshima, Japan

[73] Assignee: Shin-Daiwa Kogyo K.K., Hiroshima, Japan

[21] Appl. No.: 763,073

[22] Filed: Aug. 5, 1985

Related U.S. Application Data

[63] Continuation of Ser. No. 536,948, Sep. 27, 1983, abandoned.

[30] Foreign Application Priority Data

Oct. 1, 1982 [JP] Japan .......................... 57-150077[U]
Jan. 19, 1983 [JP] Japan ............................ 58-6183[U]
Jan. 26, 1983 [JP] Japan ........................... 58-10379[U]
Jan. 27, 1983 [JP] Japan ........................... 58-10822[U]

[51] Int. Cl.[4] .............................................. B25B 1/02
[52] U.S. Cl. ..................................... 269/181; 269/246
[58] Field of Search .............. 269/179, 180, 181, 182, 269/183, 246

[56] References Cited

U.S. PATENT DOCUMENTS

| 490,603 | 1/1893 | Schmidt | 269/181 |
| 2,469,600 | 5/1949 | Jordan | 269/180 |
| 3,752,466 | 8/1973 | Johnson | 269/246 |

Primary Examiner—Frederick R. Schmidt
Assistant Examiner—Judy J. Hartman
Attorney, Agent, or Firm—Robert L. Harrington

[57] ABSTRACT

A vise for clamping a work piece to a workbench. One jaw of the vise is permanently mounted to the work piece and the other is carried by the threaded shaft. A block member is mounted to the workbench spaced from one jaw a distance at least as great as the dimension of the largest work piece to be clamped between the jaws. A transfer mechanism carried by the block member includes a moveable female member adapted to be moved into and out of engagement with the threaded shaft. In the disengaged position, the shaft is freely slideable in the block member to permit rapid positioning of the shaft. In the engaged position, the shaft can be turned to powerfully clamp the work piece between the jaws.

6 Claims, 18 Drawing Figures

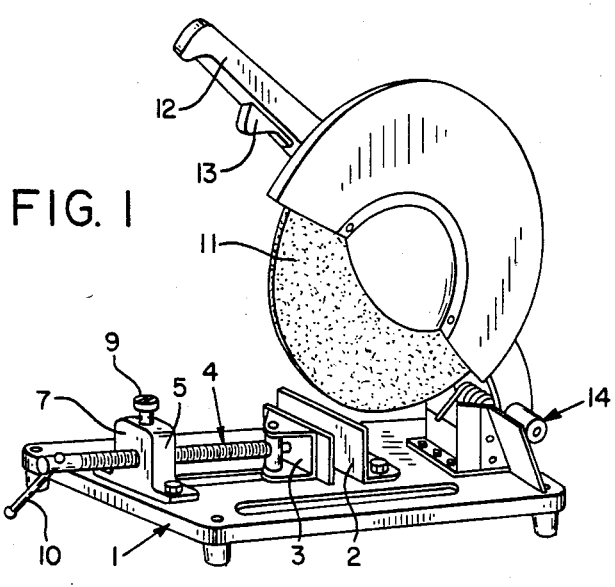
FIG. 1
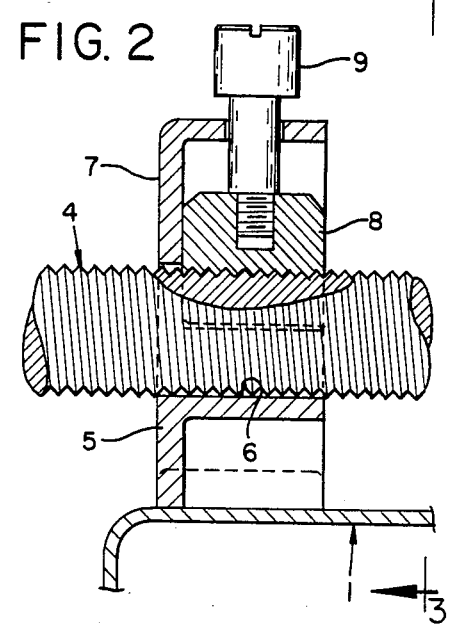
FIG. 2
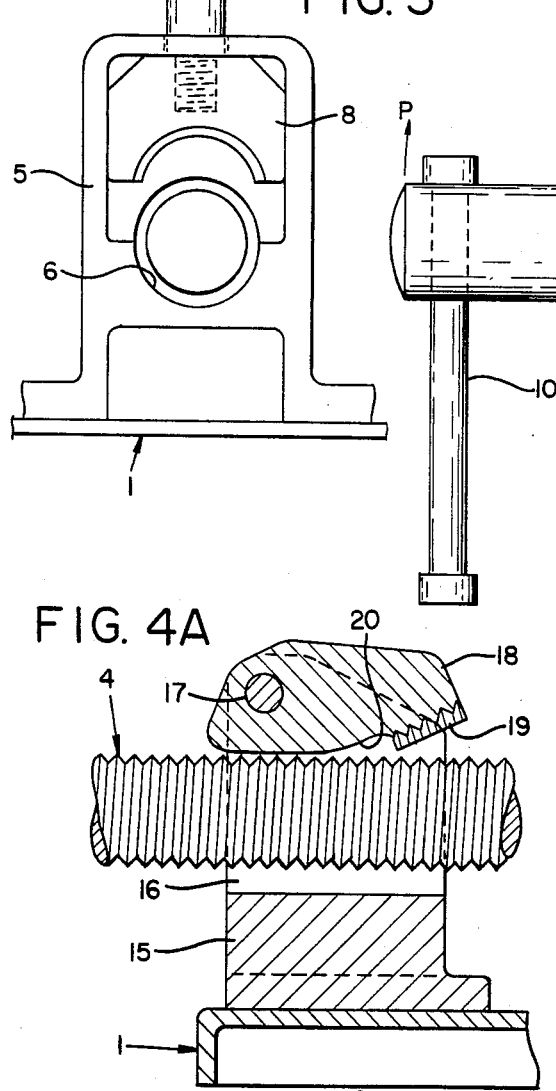
FIG. 3
FIG. 4
FIG. 4A
FIG. 5

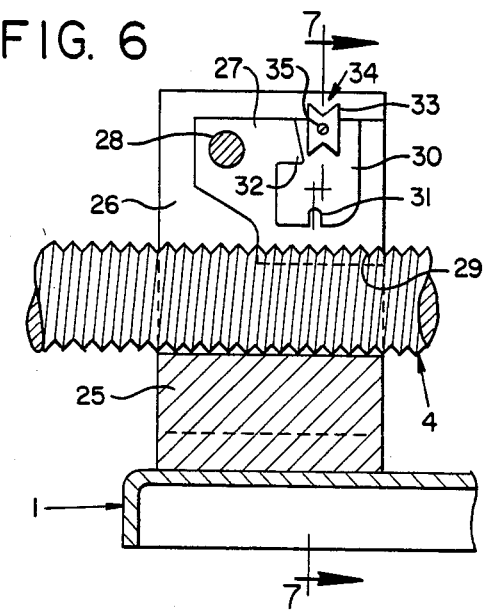
FIG. 6
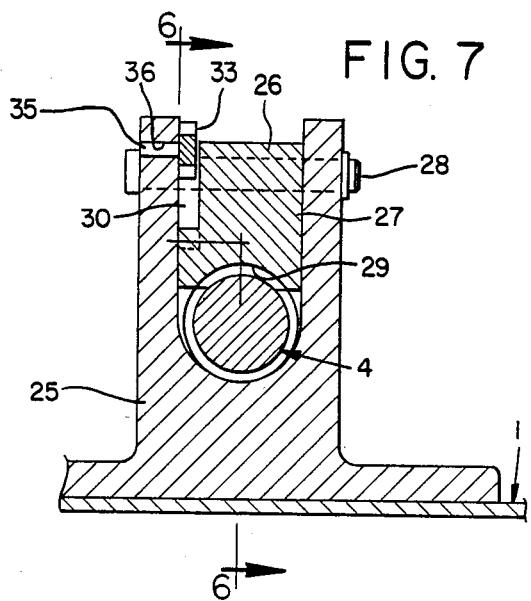
FIG. 7
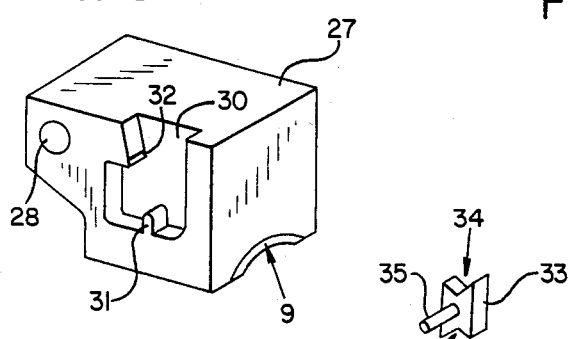
FIG. 8
FIG. 9
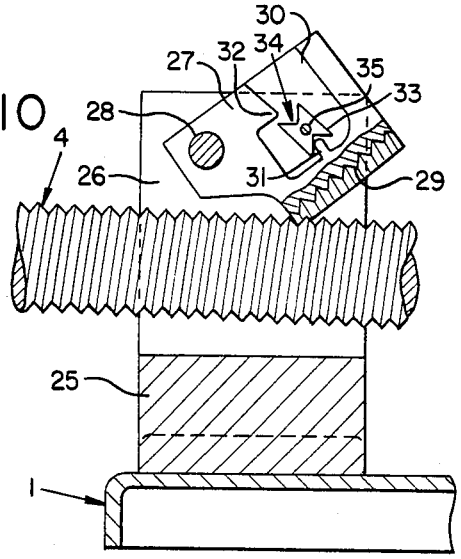
FIG. 10
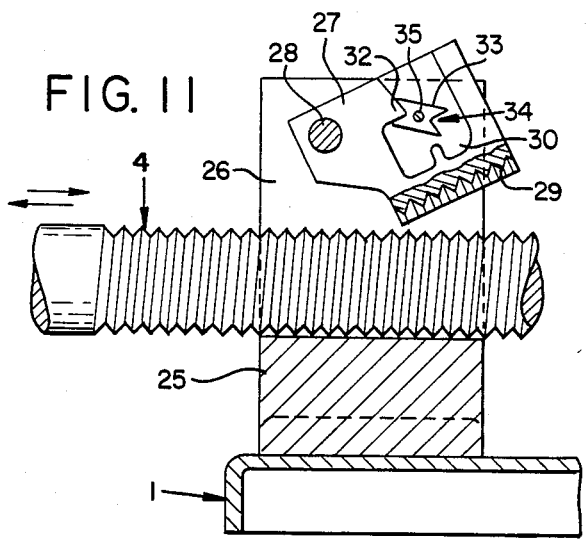
FIG. 11
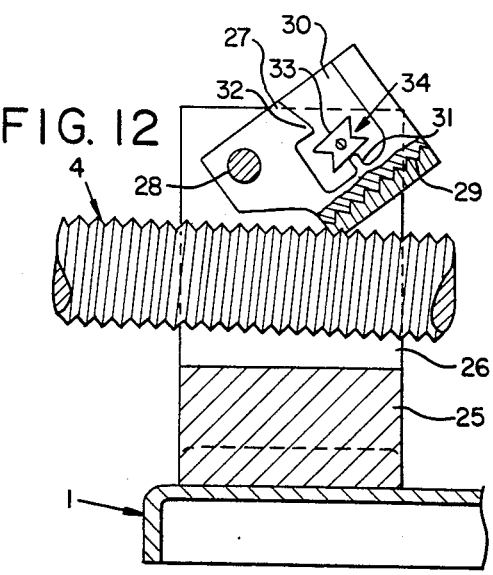
FIG. 12

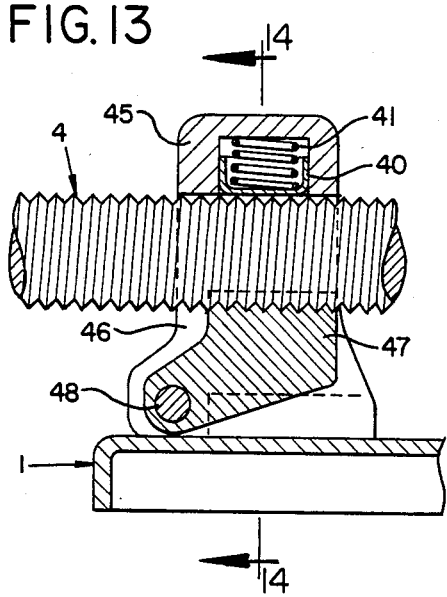
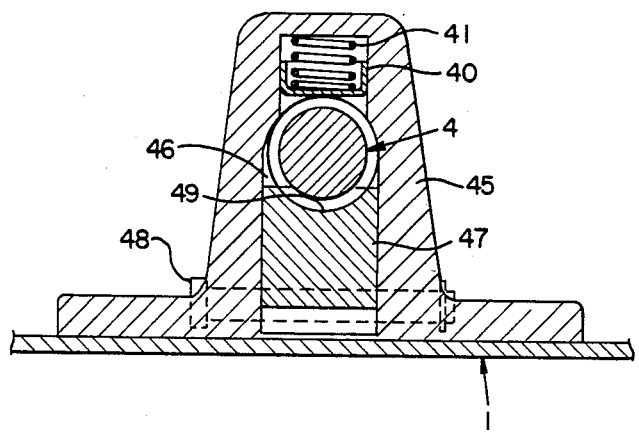
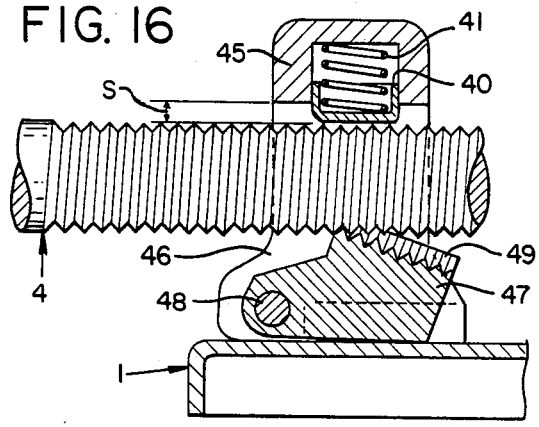
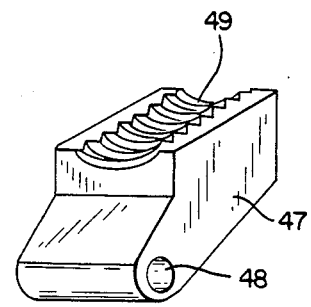
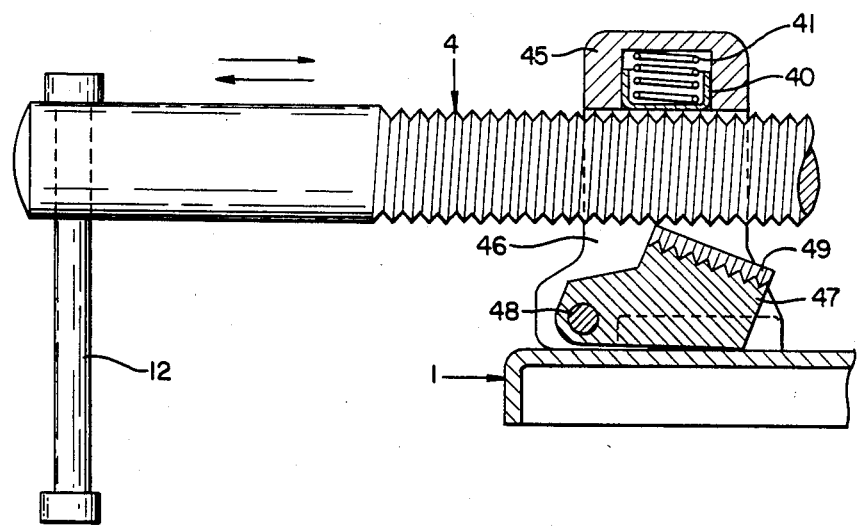

QUICK SETTING VISE

This application is a continuation, of application Ser. No. 536,948, filed 9/27/83 now abandoned.

FIELD OF INVENTION

This invention relates to a vise used to secure work pieces on a workbench or the like thereby enabling a worker to work on the work piece as by sawing.

BACKGROUND OF INVENTION

Vises such as contemplated herein are commonly used for building and repair projects of all kinds. A typical vise is one having a pair of jaws with one of the jaws rigidly fixed to a workbench. A second jaw is movable by a transfer mechanism toward and away from the first jaw. The jaws are initially opened, a work piece is placed between the jaws in the desired position, and then the jaws are closed to hold the work piece for whatever job is to be performed on it.

It is important that the jaws of the vise are capable of applying sufficient clamping or holding pressure so that the work piece will not be easily dislodged, even when the job being performed involves sawing, hammering or the like. To ensure that adequate clamping pressure is available, the transfer mechanism is generally provided by a screw arrangement. A female screw in the form of a threaded block is secured to the workbench at a position spaced from the stationary jaw and a male screw in the form of a threaded shaft is threadably engaged with the block. One end of the shaft carries the second jaw and the other a handle which enables the operator to screw the shaft through the block and thus screw the second jaw toward and away from the first jaw.

The vise is generally adapted to hold work pieces having a wide assortment of dimensions. Thus in one situation a work piece may be held with the jaws spaced less than an inch apart. In another situation the jaws may be ten, twenty or more inches apart. The typical screw thread configuration provides for advancement of the male screw shaft in the order of ⅛ of an inch or less for each revolution of the shaft. Moving the second jaw several inches toward or away from the first jaw therefore requires dozens of revolutions. This is time consuming and wasteful of the operator's energy.

BRIEF DESCRIPTION OF THE INVENTION

The present invention recognizes that the threaded engagement between the male and female screw members is required only at the point where clamping pressure is to be applied to the work piece. Accordingly, in its broad concept, a block is provided having a guide opening through which the threaded shaft is freely slideable. A female screw member is carried by the block and is movable into and out of the guide opening to thereby engage and disengage the threaded shaft. When engaged, the shaft can be advanced only by turning the shaft. When disengaged, the shaft will freely slide in the guide opening and can be rapidly positioned as desired.

DETAILED DESCRIPTION AND DRAWINGS

The invention and its advantages will be more clearly understood by reference to the following detailed description and drawings wherein:

FIG. 1 is a perspective view of a sawing apparatus including a workbench and vise for holding a work piece in accordance with the present invention;

FIG. 2 is a sectional side view of a portion of the transfer mechanism of FIG. 1;

FIG. 3 is a view of the transfer mechanism as taken on lines 3—3 of FIG. 2;

FIG. 4 is a sectional side view of a portion of the transfer mechanism of a second embodiment of the invention;

FIG. 4a is a view similar to FIG. 4 but illustrating the transfer mechanism in a release position;

FIG. 5 is a view of the transfer mechanism as taken on line 5—5 of FIG. 4;

FIG. 6 is a sectional side view of a portion of the transfer mechanism of a third embodiment as viewed from line 6—6 of FIG. 7;

FIG. 7 is a view taken on line 7—7 of FIG. 6;

FIG. 8 is a perspective view of the female screw member of the transfer mechanism shown in FIGS. 6 and 7;

FIG. 9 is a perspective view of a holding member within the transfer mechanism of FIGS. 6 and 7;

FIGS. 10, 11, and 12 illustrate the operation of the female screw member and holding member within the transfer mechanism of FIGS. 6 and 7;

FIG. 13 is a sectional side view of a portion of the transfer mechanism of a fourth embodiment of the invention;

FIG. 14 is a view taken on lines 14—14 of FIG. 13;

FIG. 15 is a perspective view of the female screw member of the transfer mechanism of FIGS. 13 and 14;

FIG. 16 is a view similar to FIG. 13 but illustrating the transfer mechanism in a rest or inactive position; and FIG. 17 is a view similar to FIGS. 13 and 16 but illustrating the transfer mechanism in a release position.

Referring to FIG. 1, a stationary vise jaw 2 is mounted on a workbench 1 and a movable vise jaw 3 is mounted on the end of a male member in the form of a threaded shaft 4. A block member 5 is mounted on the workbench 1 in spaced relation to the stationary jaw 2. The block member 5 has an unthreaded guide opening through the outer wall 7 to receive the threaded shaft and an unthreaded semi-circular surface 6 within the block that slideably supports the threaded shaft.

A channel within the block 5 receives a female member in the form of a threaded halfnut 8. The halfnut 8 is moveable within the channel between a first position where the halfnut is threadably engaged with the threaded shaft (FIG. 2) and a second position where it is disengaged therefrom (FIG. 3). A knob 9 is connected to the halfnut and is protruded from the top of the block where it can be grasped by the operator and moved between said first and second positions. The halfnut 8 slides up and down in the channel in contact with the outer wall 7 which functions to support the halfnut during clamping of a work piece within the jaws, which operation will now be explained.

OPERATION OF FIRST EMBODIMENT

With the halfnut 8 in the engaged position of FIG. 2, relative movement of the threaded shaft 4 through the block 5 is accomplished only by rotatably turning the shaft as by turning the handle 10. Therefore the operator first disengages the half-nut 8 from the threaded shaft by raising knob 9 as illustrated in FIG. 3. The opening in the block and the surface 6 permit free sliding movement of the shaft 4 which is then pulled through the block to separate the moveable jaw 3 from the stationary jaw 2 so as to receive the work piece. The work piece is placed between the jaws and with the knob 9 and halfnut 8 still in the disengaged position of FIG. 3, the moveable jaw is moved into engagement with the work piece. The halfnut 8 is then moved into engagement with the threaded shaft and as previously mentioned, further movement is only possible by turning the shaft. Powerful clamping pressure can now be applied to the work piece and as will be noted in FIG. 2, the wall 7 provides the support backing for the halfnut 8.

With the work piece securely clamped between the vise jaws, the handle 12 is grasped by the operator and the switch 13 engaged to provide rotary power to the cutting grindstone 11. The handle 12 is moved downward to similarly move the cutting grindstone 11 in an arc around the pivot 14 into cutting contact with the work piece.

Upon completion of the cutting operation, the moveable jaw must initially be moved by turning of the handle 10 to release the binding pressure effected by the powerful clamping of the vise jaws. With this binding pressure releived the halfnut 8 can again be moved out of engagement with the shaft 4 and the shaft quickly and easily withdrawn through the block 5 to open the vise jaws and permit removal of the work piece.

SECOND EMBODIMENT

Reference is now made to FIGS. 4, 4a and 5 wherein a second embodiment of the invention is illustrated. Whereas the differences between the first and second embodiment are contained within the male and female counterparts of the transfer mechanism, only those features are illustrated. It is to be understood that this second embodiment is equally applicable to the sawing apparatus including the structure of the vise jaws and workbench of FIG. 1.

The block member 15 in this second embodiment is U shaped to provide a space 16 between the upwardly projected legs of the U. A support pin 17 spanning the space 16 and connected at each end to a leg of the U pivotally carries a female screw member 18 near the rearward end thereof. Female screw threads 19 are provided adjacent the forward end of the female screw member and are adapted to be pivoted into and out of engagement with the shaft 4. The surface 20 of the female screw member rearwardly of the threads on the bottom side is smooth and arcuate shaped forming a belly-like surface whereby a slight raising of the shaft 4, as indicated by the arrow P, pivots the female member upwardly whereby the female threads are disengaged from the threads of the shaft 4 by reason of the engagement of the smooth arcuate bottom surface 20.

OPERATION OF THE SECOND EMBODIMENT

Rapid opening and closing of the vise jaws is accomplished by raising the rear end of the shaft 4 which raises the forward end of the female screw member as shown in FIG. 4a. The shaft 4 can then be freely moved through the block member 15 in that the male threads of the shaft 4 are engaging only the smooth arcuate surface 20 of the female member 18. With the moveable jaw of the vise abutted against the work piece, the rear end of the shaft 4 is dropped to it's lower position, allowing the female screw member to be pivoted toward the shaft through gravity action, and the threads are engaged as shown in FIGS. 4 and 5. The jaws can then be powerfully clamped to the work piece by the turning of the handle 10. Due to the forward position of the female screw threads 19, the back pressure urges further pivoting of female member toward the shaft to further tighten the engagement between the threads of the female member and the shaft. Release of the work piece requires release of the clamping pressure by reverse turning of the handle 10. Upon release of the clamping pressure, the shaft 4 can again be raised and freely withdrawn through the block member 15.

THIRD EMBODIMENT OF THE INVENTION

Reference is now made to FIGS. 6 through 12. Again this embodiment is applicable to a sawing apparatus as shown in FIG. 1, including the workbench and vise jaws.

The block member 25 is U shaped forming a space 26 between the upwardly extended legs of the U. The threaded shaft 4 is supported by the smooth surface of the block member at the bottom of the space 26. A support pin 28 between the legs of the U pivotally supports a female screw member 27 within the space 26. The female screw member 27 is provided with female screw threads 29 on a forward bottom surface thereof and is adapted to be pivoted into and out of engagement with the male screw threads of shaft 4.

A recess 30 in the female member is provided with an upwardly thrusting protuberance 31 at it's bottom and a fastening protuberance 32 on it's side. Located within the recess 30 but rotatably carried by a leg of the U shaped block 25 is a parallelepiped member 33 having V shaped notchs 34. A support pin 35 projected from one face of the member 33 is journaled in a bearing opening 36 in the leg of the U. The size of the recess 30 and it's protuberances 31 and 32, and the size of the parallelepiped member 33 and it's notch 34 are interrelated so that raising of the female member 27 as by raising the rear end of the shaft 4, moves the protuberance 31 of the recess in the female member into engagement with member 33. In one case such engagement is with a notch 34 whereby the member 33 is rotated to position the opposite notch 34 into engageable position with protuberance 32, and in the other case engagement is with a straight side of the member 33 whereby member 33 is rotated out of engageable position with protuberance 32.

OPERATION OF THE THIRD EMBODIMENT OF THE INVENTION

FIGS. 6, 10, 11 and 12 illustrate the sequence for shifting the female screw threads into and out of engagement with the screw threads of the shaft 4. With the screw threads engaged, the member 33 is positioned with the V shaped notchs facing up and down (FIG. 6). Whereas the operator desires to disengage the threads to permit free sliding of the shaft 4, he raises the rear end of the shaft to thereby lift the female member and move protuberance 31 into engagement with the V shaped notch 34. Continued raising of the female member forces rotation of member 33. Such rotation of member 33 aligns the opposite V shaped notch 34 with protuberance 32 (FIG. 10). The shaft 4 is then lowered and whereas protuberance 31 simply drops away from the notch 34, member 33 retains it's position until engaged by protuberance 32. As protuberance 32 seats in the notch 34, the member 33 is further rotated into the position in FIG. 11.

The female member is thereby held in a raised position with the female and male screw threads disengaged to thereby permit free sliding movement of the shaft 4 within the block member. When a work piece is placed between the vise jaws and the shaft 4 pushed forward to abut the moveable jaw with the work piece, the shaft 4 is again raised and this time the protuberance 31 engages the straight side of member 33. Protuberance 32 is lifted free of the notch 34 so that continued raising of the female member forces further turning of the member 33 to move notch 34 out of alignment with protuberance 32(FIG. 12). Dropping the shaft 4 allows the female member to drop all the way back to it's initial position shown in FIG. 6 with the screw threads inter-engaged. The jaws can then be powerfully clamped onto the work piece by turning the shaft 4. The desired work can then be performed on the work piece as previously described. Releasing the work piece is accomplished by reverse turning of the shaft 4 until the binding pressure is released. The shaft 4 is then raised to repeat the sequence of the operation as just described.

FOURTH EMBODIMENT OF THE INVENTION

Referring to FIGS. 13 through 17, a fourth embodiment of the invention is illustrated. Again the sawing apparatus of FIG. 1 is not illustrated but it will be understood that the transfer mechanism of this fourth embodiment is equally applicable thereto.

A block member 45 is provided with a guide opening 46 for passage of the shaft 4. A cylindrical cavity in the block member 45 above the guide opening 46 houses a coil spring 41 that spring biases a cup shaped bearing number 40 into the guide opening and against the shaft 4.

A female screw member 47 is pivotally carried between two legs of the block member by a pin 48. The female screw member is configured so that it's weight tends to pivot the female member forwardly around pin 48 as shown in FIGS. 16 and 17. Threads 49 are formed on the upward forward surface of the female member 40 with the rearmost threads being engaged by the threads of the shaft 4 in a normal position as shown in FIG. 16.

OPERATION OF THE FOURTH EMBODIMENT

In a normal or rest position as shown in FIG. 16, the spring 41 acting through bearing member 40 against the shaft 4, urges the shaft into engagement with the rearmost threads 49 of the female member 47. Should the shaft 4 be turned as when clamping a work piece, a rearward force is imparted to the engaged threads of the female member to pivot the female member into a raised position whereby the threads are fully engaged by the threads of shaft 4 and the bearing member 40 is recessed into the cylindrical cavity as shown in FIG. 13. Reverse turning of the shaft 4 returns the female member to the position of FIG. 16. To obtain free sliding movement of shaft 4 within the guide opening 46, with the shaft and female member in the position of FIG. 16, the rear end of the shaft is raised against the spring force of spring 41 to the position shown in FIG. 17. This disengages fully the threads of female member 47 and while in the raised position the shaft 4 is freely slideable through the guide opening.

A work piece, in the same manner as described for the first, second, and third embodiments, is placed between the vise jaws and the moveable jaw positioned against the work piece. The shaft 4 is then dropped and the handle 42 turned to fully engage the female and male threads as described and thereby provide for powerful clamping of the work piece. Upon completion of the job, the handle 42 is turned in reverse to relieve the binding pressure and return the female member to the rest position of FIG. 16 to then permit raising of the shaft and free sliding thereof through guide opening 46.

Whereas the above detailed descriptions are illustrative of four variations of the transfer mechanism, having the features of rapid opening and closing of vise jaws coupled with threaded engagement for powerful clamping as desired by the operator, other variations and modifications will become apparent to those skilled in the art without departing from the invention. The scope of the invention is therefore to be determined by reference to the claims appended hereto.

I claim:

1. A quick setting vise comprising; a support surface, a first vise jaw fixed to the support surface, a transfer mechanism including a block member fixed to said support surface and spaced from the first vise jaw, said block member having a guide opening, and a threaded shaft projected through the guide opening and adapted for axial movement through the guide opening, a second vise jaw mounted on the shaft and movable therewith in a first axial direction toward the first vise jaw for clamping a work piece between the jaws and movable in a second axial direction away from the first vise jaw, and the improvement that comprises;

said guide opening defining a support surface that partially encircles the shaft in a shaft supporting position and permits lateral movement of the shaft in a direction out of contact with said support surface, an elongated female screw member having first and second ends pivotally connected at the first end to the block member outwardly of said shaft and opposite said support surface and the second end projected from said pivotal connection in the said first axial direction of movement of the threaded shaft, a female threaded section on said second end of the female screw member adapted for engagement and disengagement with the threaded shaft at a circumferential position opposite to the support surface upon pivotal movement of the female screw member toward and away from the shaft, and urging means urging interengagement of the female screw member and threaded shaft for clamping the shaft between the support surface of the guide opening and the female threaded section of the female screw member, and said shaft being laterally manually movable in said guide opening away from said support surface to oppose said urging means and thereby to pivot the female threaded member for disengagement of the female threaded section and threaded shaft.

2. A quick setting vise as defined in claim 1 wherein; the female screw member is mounted below the threaded shaft with the screw threads on a top forward end portion, said female screw member pivoted around a horizontal pivot whereby the weight of the screw member urges downward pivoting away from the threaded shaft, a spring means mounted in the block member above the threaded shaft urging downward positioning of the shaft and partial engagement of the threaded shaft with the female screw member whereby turning of the shaft for clamping a work piece forces upward pivoting of the female screw member and full engagement of the threads of the female member with the threaded shaft, and said shaft in said downward position in partial engagement of the threads of the female member being moveable against the spring means to fully release the threads of the female member from the threaded shaft for free sliding of the shaft through the guide opening.

3. A quick setting vise as defined in claim 1 wherein; the female screw member is mounted above the threaded shaft with the screw threads on a bottom forward end portion, said female screw member pivoted around a horizontal pivot whereby the weight of the screw member urges downward pivoting of the screw member for interengagement with the threaded shaft, said shaft being moveable upwardly in the guide opening to force upward pivoting of the female screw member, and releasable holding means mounted on the block member that is engaged by the upwardly pivoted female screw member for holding the female screw member in the raised position to thereby permit disengagement of the screw threads with the threaded shaft in the lower position and free sliding movement thereof through the guide opening.

4. A quick setting vise as defined in claim 3 wherein; the holder is rotatably mounted on the block member and has cooperating notchs therein, said female screw member having cooperating protuberances whereby in one situation raising the female screw member causes engagement of one protuberance with the holder and partial turning of the holder for aligning a second protuberance with a notch of the holder so that complete lowering of the female member is prevented by the second protuberance engaging the notch, and in a second situation raising the female screw member causes engagement of said one protuberance with the holder and further partial turning of the holder for mis-aligning the second protuberance with the notch of the holder so that complete lowering of the female member is permitted.

5. A quick setting vise as defined in claim 1 wherein said urging means urges pivoting of the female screw member toward the shaft, and a smooth intermediate belly-like surface on said female screw member between said pivotal connection and said female threaded section is engaged by the shaft upon said lateral movement of the shaft for disengagement of the female screw member and threaded shaft.

6. A quick setting vise as defined in claim 5 wherein the pivotal connection of the female screw member is above the shaft, and the urging means is produced by gravity urging downward pivotal movement of the second end of the female screw member and the female threaded section carried thereby toward the underlying shaft.

* * * * *